(12) United States Patent
Nopwaskey et al.

(10) Patent No.: US 9,959,943 B2
(45) Date of Patent: May 1, 2018

(54) METHOD AND APPARATUSES FOR OPERATING AND REPAIRING NUCLEAR REACTORS

(71) Applicant: General Electric Company, Schenectady, NY (US)

(72) Inventors: Fred Charles Nopwaskey, Wilmington, NC (US); Ke Ling Lee, Wilmington, NC (US); Alfred Wilhelm Dalcher, Wilmington, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1149 days.

(21) Appl. No.: 14/042,927

(22) Filed: Oct. 1, 2013

(65) Prior Publication Data
US 2014/0098921 A1 Apr. 10, 2014

Related U.S. Application Data

(62) Division of application No. 11/783,365, filed on Apr. 9, 2007, now Pat. No. 8,565,366.

(51) Int. Cl.
*G21C 7/00* (2006.01)
*G21C 19/02* (2006.01)
(Continued)

(52) U.S. Cl.
CPC ............... *G21C 7/00* (2013.01); *B23P 6/00* (2013.01); *G21C 19/02* (2013.01); *G21C 19/14* (2013.01); *G21C 19/207* (2013.01); *G21Y 2002/201* (2013.01); *G21Y 2004/30* (2013.01); *G21Y 2004/40* (2013.01); *G21Y 2004/50* (2013.01); *G21Y 2004/501* (2013.01); *Y10T 29/4973* (2015.01); *Y10T 29/49735* (2015.01)

(58) Field of Classification Search
CPC ...... G21C 19/207; G21C 19/02; G21C 19/14; G21C 7/00; B23P 6/00; G21Y 2004/50
USPC .............. 376/203, 260, 285, 286; 29/402.08, 29/402.12, 447; 138/99; 405/184.1, 405/184.2, 184.5
See application file for complete search history.

(56) References Cited

U.S. PATENT DOCUMENTS 2,011,433 A 8/1935 Blagg et al.
3,404,897 A 10/1968 Carter, Jr. et al.
(Continued)

FOREIGN PATENT DOCUMENTS

JP 09021897 1/1997
JP 11125245 5/1999
JP 2008032468 A 2/2008

OTHER PUBLICATIONS

Ranganath, "Proactive approaches to assure the structural integrity of Boiling Water Reactor components", Nuclear Engineering and Design 124 (1990) 53-70.*

(Continued)

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

The method includes repairing a nuclear reactor, where the reactor includes one or more submerged lines welded to one or more support brackets. The method involves removing a damaged section of the one or more submerged lines, and replacing the damaged section without welding.

11 Claims, 9 Drawing Sheets

(51) Int. Cl.
*G21C 19/14* (2006.01)
*G21C 19/20* (2006.01)
*B23P 6/00* (2006.01)

(56) References Cited

U.S. PATENT DOCUMENTS

| | | | |
|---|---|---|---|
| 4,124,229 A | 11/1978 | Ahlstone | |
| 4,265,470 A | 5/1981 | Danner | |
| 4,662,660 A | 5/1987 | Perea | |
| 4,872,713 A * | 10/1989 | Kapgan | F16B 1/0014 285/369 |
| 5,301,213 A * | 4/1994 | Linden | G21C 19/207 376/260 |
| 5,388,617 A * | 2/1995 | Sasaki | F16L 55/168 138/99 |
| 5,615,239 A | 3/1997 | Deaver et al. | |
| 5,687,995 A * | 11/1997 | Mori | F16L 13/004 29/447 |
| 5,732,743 A | 3/1998 | Livesay | |
| 5,752,807 A * | 5/1998 | Erbes | G21C 15/25 411/84 |
| 6,142,698 A | 11/2000 | Nutter, deceased | |
| 6,163,588 A * | 12/2000 | Matsumoto | G21C 1/08 376/247 |
| 6,195,892 B1 * | 3/2001 | Weems | G21C 15/18 29/890.03 |
| 6,233,301 B1 | 5/2001 | Robergeau | |
| 6,435,839 B1 * | 8/2002 | Erbes | G21C 15/25 376/247 |
| 6,637,110 B2 * | 10/2003 | Jee | F16L 13/004 29/447 |
| 6,988,747 B2 | 1/2006 | Allen et al. | |
| 7,578,191 B2 * | 8/2009 | Kasik | G01H 1/06 73/590 |
| 7,896,302 B2 * | 3/2011 | Parker | G21C 15/25 248/62 |
| 7,938,923 B2 * | 5/2011 | Hood | B29C 35/0272 138/98 |
| 8,210,491 B2 * | 7/2012 | Matsumoto | G21C 13/032 403/188 |
| 8,233,301 B1 | 7/2012 | Guo | |
| 8,548,114 B2 * | 10/2013 | Jensen | G21C 17/017 376/347 |
| 9,312,036 B2 * | 4/2016 | Minato | G21C 19/14 |
| 2015/0016583 A1 * | 1/2015 | Minato | G21C 19/207 376/372 |

OTHER PUBLICATIONS

Blaha, Enforcement, SECY 97-272, "For: The Commissioners", In Workshop on Generic Letter, vol. 96, p. 06, 1997.*
Luk, "Boiling-Water Reactor Internals Aging Degradation Study", NUREG/CR-5754, ORNL/TM-11876, Sep. 1993.*
Office Action issued in connection with JP Application No. 2008-097652, dated Feb. 6, 2013.

* cited by examiner

US 9,959,943 B2

METHOD AND APPARATUSES FOR OPERATING AND REPAIRING NUCLEAR REACTORS

CROSS-REFERENCE TO RELATED APPLICATION(S)

This application is a divisional of U.S. patent application Ser. No. 11/783,365, filed on Apr. 9, 2007, in the U.S. Patent and Trademark Office, the entire contents of which are incorporated herein by reference, and claims the associated benefit under 35 U.S.C. § § 120 and 121.

BACKGROUND

1. Field

Example embodiments relate to methods and apparatuses for operating and repairing nuclear reactors. Additionally, example embodiments relate to methods and apparatuses for operating and repairing nuclear reactors that include one or more submerged lines welded to one or more support brackets.

2. Description of Related Art

FIG. 1 is a sectional view, with parts cut away, of reactor pressure vessel ("RPV") 100 in a related art BWR. During operation of the BWR, coolant water circulating inside RPV 100 is heated by nuclear fission produced in core 102. Feedwater is admitted into RPV 100 via feedwater inlet 104 and feedwater sparger 106 (a ring-shaped pipe that includes apertures for circumferentially distributing the feedwater inside RPV 100). The feedwater from feedwater sparger 106 flows down through downcomer annulus 108 (an annular region between RPV 100 and core shroud 110).

Core shroud 110 is a stainless steel cylinder that surrounds core 102. Core 102 includes a multiplicity of fuel bundle assemblies 112 (two 2×2 arrays, for example, are shown in FIG. 1). Each array of fuel bundle assemblies 112 is supported at or near its top by top guide 114 and at or near its bottom by core plate 116. Top guide 114 provides lateral support for the top of fuel bundle assemblies 112 and maintains correct fuel-channel spacing to permit control rod insertion.

The coolant water flows downward through downcomer annulus 108 and into core lower plenum 118. The coolant water in core lower plenum 118 in turn flows up through core 102. The coolant water enters fuel assemblies 112, wherein a boiling boundary layer is established. A mixture of water and steam exits core 102 and enters core upper plenum 120 under shroud head 122. Core upper plenum 120 provides standoff between the steam-water mixture exiting core 102 and entering standpipes 124. Standpipes 124 are disposed atop shroud head 122 and in fluid communication with core upper plenum 120.

The steam-water mixture flows through standpipes 124 and enters steam separators 126 (which may be, for example, of the axial-flow, centrifugal type). Steam separators 126 substantially separate the steam-water mixture into liquid water and steam. The separated liquid water mixes with feedwater in mixing plenum 128. This mixture then returns to core 102 via downcomer annulus 108. The separated steam passes through steam dryers 130 and enters steam dome 132. The dried steam is withdrawn from RPV 100 via steam outlet 134 for use in turbines and other equipment (not shown).

The BWR also includes a coolant recirculation system that provides the forced convection flow through core 102 necessary to attain the required power density. A portion of the water is sucked from the lower end of downcomer annulus 108 via recirculation water outlet 136 and forced by a centrifugal recirculation pump (not shown) into a plurality of jet pump assemblies 138 (only one of which is shown) via recirculation water inlets 140. Jet pump assemblies 138 are circumferentially distributed around core shroud 110 and provide the required reactor core flow.

As shown in FIG. 1, a related art jet pump assembly 138 includes a pair of inlet mixers 142. A typical BWR includes 16 to 24 inlet mixers 142. Each inlet mixer 142 has an elbow 144 welded to it that receives water from a recirculation pump (not shown) via inlet riser 146. An example inlet mixer 142 includes a set of five nozzles circumferentially distributed at equal angles about the axis of inlet mixer 142. Each nozzle is tapered radially inwardly at its outlet. Jet pump assembly 138 is energized by these convergent nozzles. Five secondary inlet openings are radially outside of the nozzle exits. Therefore, as jets of water exit the nozzles, water from downcomer annulus 108 is drawn into inlet mixer 142 via the secondary inlet openings, where it is mixed with coolant water from the recirculation pump. The coolant water then flows into jet pump assembly 138.

FIG. 2 is a sectional view, with parts cut away and/or in silhouette, of the interior of RPV 100 in a related art BWR. Each jet pump assembly 138 has a sensing line 200 that is in fluid communication with a plurality of pressure taps at the top of diffuser 148 and with instrumentation (not shown) located outside RPV 100. Sensing lines 200 allow the core flow to be measured and monitored. The flow through and outside jet pump assemblies 138 includes pressure fluctuations from various sources in the nuclear reactor. These pressure fluctuations may have frequencies close to one or more natural vibration modes of sensing lines 200. These vibration modes depend on the spacing and stiffness of sensing lines 200 and support brackets 202 that attach sensing lines 200 to one or more of jet pump assemblies 138. When an excitation frequency happens to be too close to matching the natural frequency of one or more sensing lines 200 at some particular location, vibration of sensing lines 200 may exert loads on sensing lines 200 and/or support brackets 202 that can cause cyclic fatigue cracking and/or failure of sensing lines 200 and/or support brackets 202. This phenomenon may result in loss of the indication of core flow which, if it occurs at enough locations, may require plant shutdown.

Sensing lines 200 also may be subjected to damage caused by objects (i.e., head bolts for core shroud 110) falling on sensing lines 200 during maintenance, repair, and/or other procedures. This may be particularly true for sensing lines 200 oriented in a substantially horizontal direction, such as sensing lines 200 routed from jet pump assemblies 138 to penetration nozzle 204 through wall 206 of RPV 100.

Various solutions to the problems of jet pump sensing line failure, repair, and replacement have been proposed, as discussed, for example, in U.S. Pat. No. 5,615,239 ("the '239 patent"), U.S. Pat. No. 5,752,807 ("the '807 patent"), U.S. Pat. No. 6,163,588 ("the '588 patent"), U.S. Pat. No. 6,233,301 B1 ("the '301 patent"), and U.S. Pat. No. 6,435,839 B1 ("the '839 patent"). The disclosures of the '239 patent, the '807 patent, the '588 patent, the '301 patent, and the '839 patent are incorporated in this application by reference. However, these various solutions do not include methods or apparatuses for operating and repairing nuclear reactors that include one or more submerged lines welded to one or more support brackets, wherein damage to one or more of the submerged lines can be repaired without welding.

SUMMARY

Example embodiments may relate to methods and apparatuses for operating and repairing nuclear reactors. Additionally, example embodiments may relate to methods and apparatuses for operating and repairing nuclear reactors that include one or more submerged lines welded to one or more support brackets, wherein damage to one or more of the submerged lines can be repaired without welding.

In an example embodiment, methods of repairing nuclear reactors that include one or more submerged lines welded to one or more support brackets may include: removing a damaged section of one of the one or more submerged lines; and replacing the damaged section of the one of the one or more submerged lines without welding.

In another example embodiment, methods of repairing nuclear reactors that include one or more submerged lines welded to one or more support brackets may include: removing one or more damaged sections of the one or more submerged lines; and replacing the one or more damaged sections of the one or more submerged lines without welding.

In yet another example embodiment, methods of operating nuclear reactors that include one or more submerged lines welded to one or more support brackets may include: shutting down the nuclear reactor; repairing damage to at least one of the one or more submerged lines without welding; and starting up the nuclear reactor.

In still another example embodiment, methods of operating nuclear reactors that include one or more submerged lines welded to one or more support brackets may include: cooling down the nuclear reactor; repairing damage to at least one of the one or more submerged lines without welding; and heating up the nuclear reactor.

In a further example embodiment, apparatuses for repairing nuclear reactors that include one or more submerged lines welded to one or more support brackets may include: a body including one or more sites for fixing a spool piece to the body without welding.

In another further example embodiment, apparatuses for repairing nuclear reactors that include one or more submerged lines welded to one or more support brackets may include: a spool piece; and a body including one or more sites for fixing the spool piece to the body without welding.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
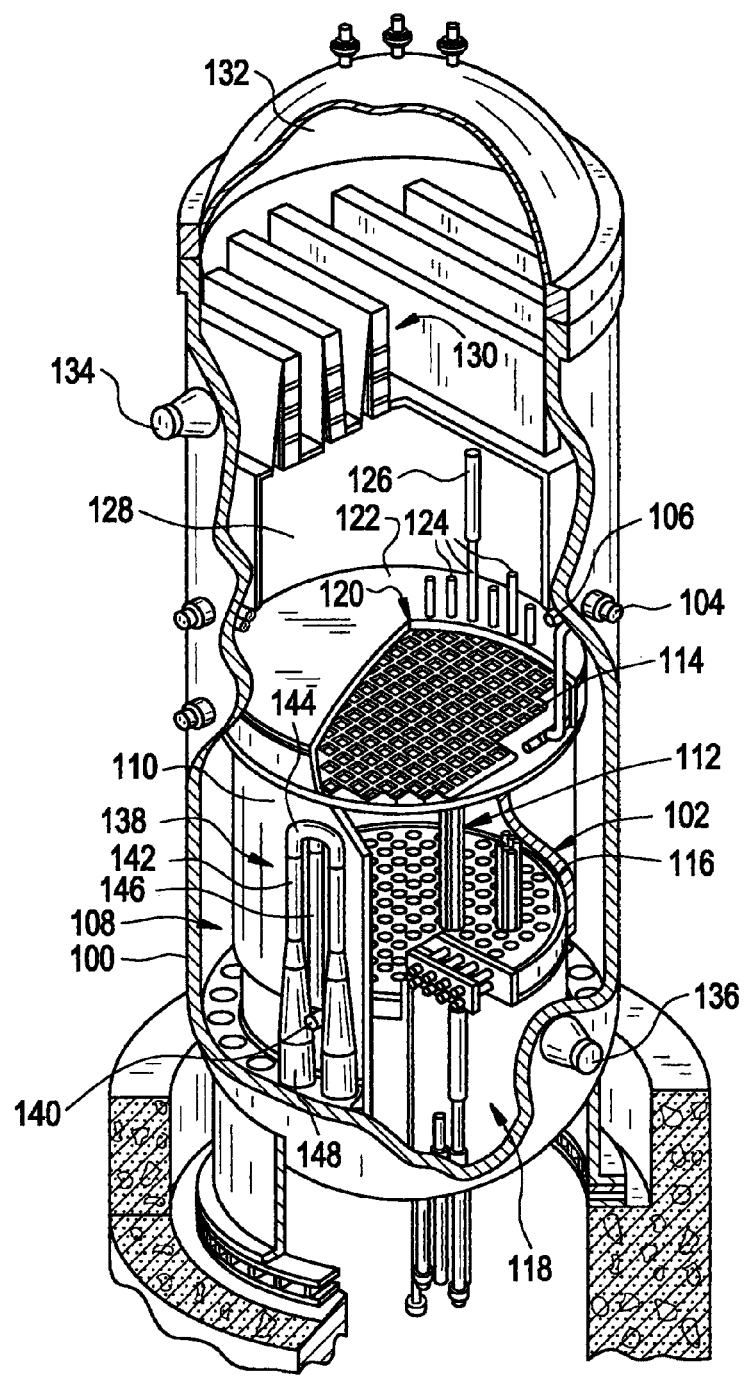
FIG. 1 is a sectional view, with parts cut away, of a RPV in a related art BWR.
Figure 2:
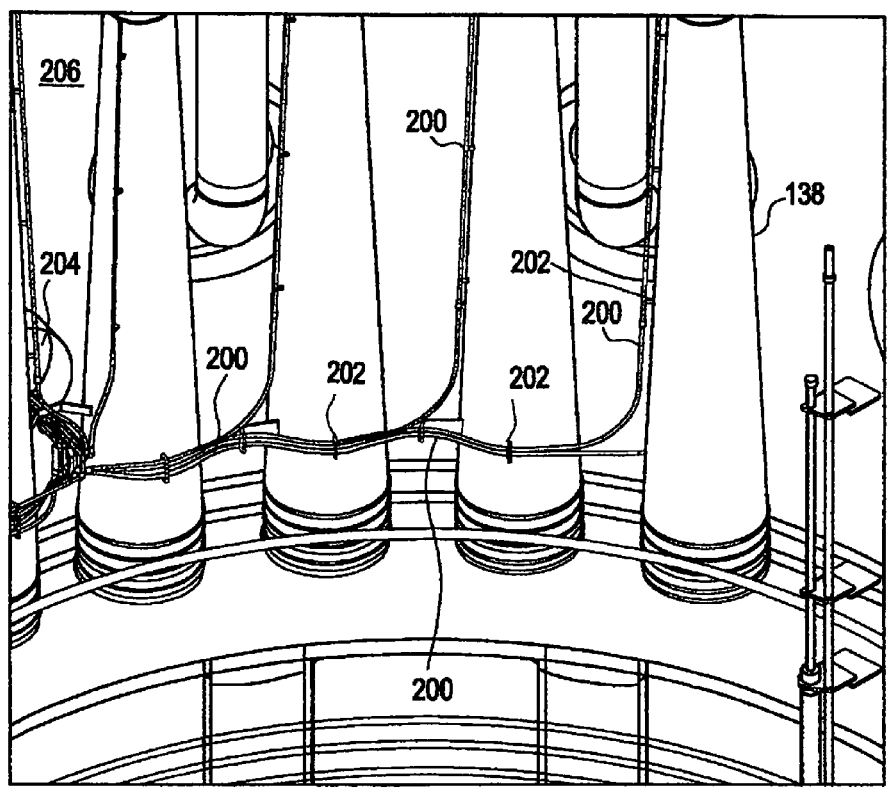
FIG. 2 is a sectional view, with parts cut away and/or in silhouette, of the interior of a RPV in a related art BWR.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art.

It will be understood that when a component is referred to as being "on," "connected to," "coupled to," or "fixed to" another component, it may be directly on, connected to, coupled to, or fixed to the other component or intervening components may be present. In contrast, when a component is referred to as being "directly on," "directly connected to," "directly coupled to," or "directly fixed to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

Spatially relative terms, such as "beneath," "below," "lower," "above," "upper," and the like may be used herein for ease of description to describe one component and/or feature relative to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to the like components throughout.

In an example embodiment, methods of repairing nuclear reactors that include one or more submerged lines welded to one or more support brackets may include: removing a damaged section of one of the one or more submerged lines; and/or replacing the damaged section of the one of the one or more submerged lines without welding The submerged lines may be, for example, instrumentation lines (i.e., jet pump differential pressure sensing lines) and/or one or more other submerged lines.

The damaged section may be identified, for example, by visual or other inspection method(s) known to one of ordinary skill in the art. The visual inspection may be conducted, for example, using a video device. At some point before or during the removal of the damaged section, the damaged section should be secured (i.e., tethered) so as to prevent it from being misplaced or lost in the nuclear reactor when it has been cut out.

Removing the damaged section may include: cutting out the damaged section from the one of the one or more submerged lines; and/or cutting out the damaged section from one of the one or more support brackets. The cuts on the submerged lines may be, for example, smooth and/or substantially perpendicular to the axial direction of the submerged line.

The damaged section may be cut out, for example, by electrical discharge machining ("EDM") or other suitable technique(s) known to one of ordinary skill in the art. After the damaged section has been cut out, it may be removed from the nuclear reactor.

Replacing the damaged section may include: substituting a spool piece, comprising ends, in place of the damaged section; joining the ends of the spool piece to the one of the one or more submerged lines; and/or connecting the spool piece to one of the one or more support brackets.

Figure 3:
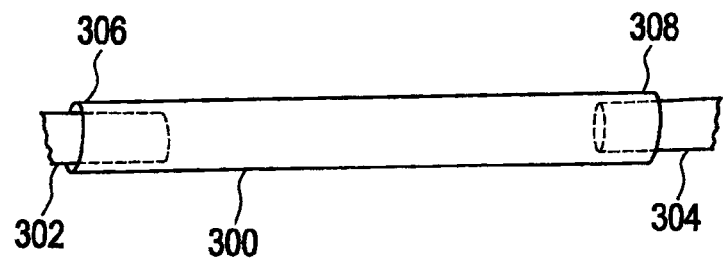
FIG. 3 is a diagram illustrating a spool piece and ends of a submerged line from which a damaged section has been cut out, according to an example embodiment.
Figure 4:
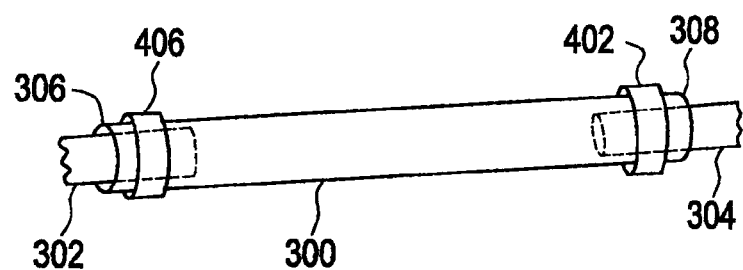
FIG. 4 is a diagram illustrating a spool piece, ends of a submerged line from which a damaged section has been cut out, and shrink fittings, according to another example embodiment.

FIG. 3 is a diagram illustrating spool piece 300 and ends 302, 304 of a submerged line from which the damaged section has been cut out, according to an example embodiment. FIG. 4 is a diagram illustrating spool piece 300, ends 302, 304 of a submerged line from which the damaged section has been cut out, and shrink fittings 406, 402, according to another example embodiment.

Spool piece 300 may include, for example, a length of tubing comparable to the damaged section cut out from a submerged line (and from a support bracket). Ends 306, 308 of spool piece 300 should correspond to ends 302, 304 of the submerged line from which the damaged section is to be cut out or was cut out.

Spool piece 300 may be longer than, about the same length as, or shorter than the damaged section that is to be cut out or was cut out. The outer diameter of spool piece 300 may be larger than, about the same as, or smaller than the outer diameter of the damaged section that is to be cut out or was cut out. The inner diameter of spool piece 300 may be larger than, about the same as, or smaller than the inner diameter of the damaged section that is to be cut out or was cut out. The inner diameter of spool piece 300 may be larger than, about the same as, or smaller than the outer diameter of the damaged section that is to be cut out or was cut out.

Spool piece 300 may include one or more grooves, ridges, lips, etc. on its inner surface near one or both ends 306, 308. When joining ends 306, 308 of spool piece 300 to the submerged line from which the damaged section was cut out, if spool piece 300 is fitted over corresponding ends 302, 304 of the submerged line, the one or more grooves, ridges, lips, etc. may improve contact between ends 306, 308 of spool piece 300 and ends 302, 304 of the submerged line.

The one or more grooves may include, for example, one or more spiral grooves, one or more parallel grooves, and/or one or more circumferential grooves. The one or more grooves may or may not be continuous. The one or more ridges may include, for example, one or more spiral ridges, one or more parallel ridges, and/or one or more circumferential ridges. The one or more ridges may or may not be continuous. The one or more lips may or may not be continuous.

Spool piece 300 may include, for example, one or more materials used in construction of a nuclear reactor. Spool piece 300 may include, for example, one or more high-strength alloys used in construction of a nuclear reactor. Spool piece 300 may include, for example, one or more stainless steels (i.e., Type 304, Type 316, and/or Type XM19) and/or one or more nickel-chromium-iron alloys (i.e., Inconel™ X750).

In addition or in the alternative, spool piece 300 may include, for example, one or more materials that change dimension(s) when exposed to temperature changes and/or that have shape-memory characteristics. Spool piece 300 may include, for example, one or more metals or metal alloys that change dimension(s) when exposed to temperature changes and/or that have shape-memory characteristics. In an example embodiment, spool piece 300 may include one or more alloys of approximately 50% titanium and approximately 50% nickel, known, for example, by the trade names Nitinol and/or Tinel, and available, for example, from Memry Corporation of Bethel, Conn., and Menlo Park, Calif. The one or more alloys may include, for example, more nickel than titanium (i.e., approximately 55 wt % Ni and approximately 45 wt % Ti). In addition or in the alternative, the one or more alloys may include, for example, one or more other alloying materials, such as niobium. In this case, the one or more alloys may include, for example, approximately 56 wt % Ni, approximately 14 wt % Nb, and approximately 30 wt % Ti). In addition to other characteristics, these alloys tend to contract with increasing temperature due to one or more phase changes occurring in the alloys.

An object that includes one or more materials that change dimension(s) when exposed to temperature changes and/or that have shape-memory characteristics may be processed over a mandrel or other suitable device to expand the object. Typically, the processing is done at temperature(s) lower than a phase-change temperature. If the object is generally round, the mandrel may also be generally round.

As discussed above, when joining ends 306, 308 of spool piece 300 to the submerged line from which the damaged section was cut out, spool piece 300 may be fitted over corresponding ends 302, 304 of the submerged line. In this case, spool piece 300 may include, for example, one or more materials used in construction of a nuclear reactor and/or one or more materials that change dimension(s) when exposed to temperature changes and/or that have shape-memory characteristics. In addition or in the alternative, one or more shrink fittings 406, 402 may be disposed on spool piece 300. One or more shrink fittings 406, 402 may act on spool piece 300 to fix or help fix spool piece 300 to corresponding ends 302, 304 of the submerged line.

One or more shrink fittings 406, 402 may include, for example, one or more materials that change dimension(s) when exposed to temperature changes and/or that have shape-memory characteristics. One or more shrink fittings 406, 402 may include, for example, one or more metals or metal alloys that change dimension(s) when exposed to temperature changes and/or that have shape-memory characteristics. In an example embodiment, one or more shrink fittings 406, 402 may include one or more alloys of approximately 50% titanium and approximately 50% nickel, known as Nitinol and/or Tinel, as discussed above. In addition or in the alternative, the one or more alloys may include, for example, one or more other alloying materials, such as niobium, as also discussed above.

One or more shrink fittings 406, 402 may include many geometries. For example, one or more shrink fittings 406, 402 may be generally round (i.e., circular, oval-shaped, rounded, curved). In an example embodiment, one or more shrink fittings 406, 402 are shrink rings available, for example, from Memry Corporation.

Spool piece 300 may include one or more grooves, ridges, lips, etc. on its outer surface near one or both ends 306, 308. Similarly, one or more shrink fittings 406, 402 may include one or more grooves, ridges, lips, etc. on their inner surface. When one or more shrink fittings 406, 402 act on spool piece 300 to fix or help fix spool piece 300 to corresponding ends 302, 304 of the submerged line, the one or more grooves, ridges, lips, etc. on the outer surface of spool piece 300 and/or the one or more grooves, ridges, lips, etc. on the inner surface of one or more shrink fittings 406, 402 may improve contact between spool piece 300 and one or more shrink fittings 406, 402, and/or improve contact between ends 306, 308 of spool piece 300 and ends 302, 304 of the submerged line.

The one or more grooves may include, for example, one or more spiral grooves, one or more parallel grooves, and/or one or more circumferential grooves. The one or more grooves may or may not be continuous. The one or more ridges may include, for example, one or more spiral ridges, one or more parallel ridges, and/or one or more circumferential ridges. The one or more ridges may or may not be continuous. The one or more lips may or may not be continuous.

One or more shrink fittings 406, 402 may be disposed on spool piece 300 in the position(s) shown in FIG. 4 prior to spool piece 300 being fitted over corresponding ends 302, 304 of the submerged line. In addition or in the alternative, one or more shrink fittings 406, 402 may be disposed elsewhere on spool piece 300 (or on end 302 and/or end 304 of the submerged line), and then disposed in the position(s) shown in FIG. 4 after spool piece 300 is fitted over corresponding ends 302, 304 of the submerged line.

Figure 5:
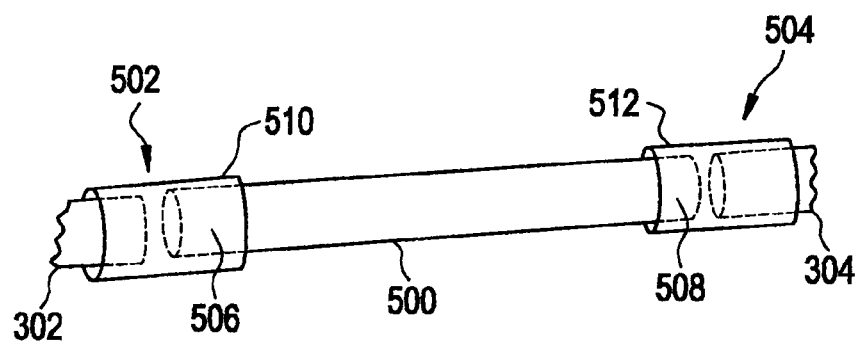
FIG. 5 is a diagram illustrating a spool piece, couplings (sleeves only), and ends of a submerged line from which the damaged section has been cut out, according to an example embodiment.
Figure 6:
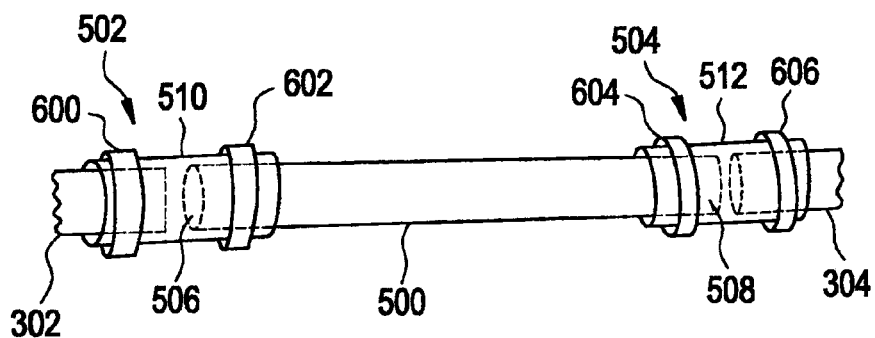
FIG. 6 is a diagram illustrating a spool piece, couplings (sleeves and shrink fittings), and ends of a submerged line from which the damaged section has been cut out, according to another example embodiment.

FIG. 5 is a diagram illustrating spool piece 500, couplings 502, 504 (sleeves 510, 512 only), and ends 302, 304 of a submerged line from which the damaged section has been cut out, according to an example embodiment. FIG. 6 is a diagram illustrating spool piece 500, couplings 502, 504 (sleeves 510, 512 and shrink fittings 600, 602, 604, 606), and ends 302, 304 of a submerged line from which the damaged section has been cut out, according to another example embodiment.

Spool piece 500 may include, for example, a length of tubing comparable to the damaged section cut out from a submerged line (and from a support bracket). Ends 506, 508 of spool piece 500 should correspond to ends 302, 304 of the submerged line from which the damaged section is to be cut out or was cut out.

Spool piece 500 may be longer than, about the same length as, or shorter than the damaged section that is to be cut out or was cut out. The outer diameter of spool piece 500 may be larger than, about the same as, or smaller than the outer diameter of the damaged section that is to be cut out or was cut out. The inner diameter of spool piece 500 may be larger than, about the same as, or smaller than the inner diameter of the damaged section that is to be cut out or was cut out.

When joining ends 506, 508 of spool piece 500 to the submerged line from which the damaged section was cut out, spool piece 500 may be disposed adjacent to corresponding ends 302, 304 of the submerged line, instead of being fitted over them. In this case, spool piece 500 may include, for example, one or more materials used in construction of a nuclear reactor. Spool piece 500 may include, for example, one or more high-strength alloys used in construction of a nuclear reactor. Spool piece 500 may include, for example, one or more stainless steels (i.e., Type 304, Type 316, and/or Type XM19) and/or one or more nickel-chromium-iron alloys (i.e., Inconel™ X750).

One or more couplings 502, 504 may be disposed on spool piece 500. Each coupling 502, 504 may include sleeve 510, 512 or sleeve 510, 512 and one or more shrink fittings 600, 602, 604, 606. If one or more couplings 502, 504 include only sleeve 510, 512, then sleeve 510, 512 may include, for example, one or more materials that change dimension(s) when exposed to temperature changes and/or that have shape-memory characteristics. In an example embodiment, sleeve 510, 512 may include one or more alloys of approximately 50% titanium and approximately 50% nickel, known as Nitinol and/or Tinel, as discussed above. In addition or in the alternative, the one or more alloys may include, for example, one or more other alloying materials, such as niobium, as also discussed above.

If one or more couplings 502, 504 includes sleeve 510, 512 and one or more shrink fittings 600, 602, 604, 606, then sleeve 510, 512 may include, for example, one or more materials used in construction of a nuclear reactor and/or one or more materials that change dimension(s) when exposed to temperature changes and/or that have shape-memory characteristics. In an example embodiment, sleeve 510, 512 may include, for example, one or more stainless steels (i.e., Type 304, Type 316, and/or Type XM19) and/or one or more nickel-chromium-iron alloys (i.e., Inconel™ X750). In addition or in the alternative, sleeve 510, 512 may include one or more alloys of approximately 50% titanium and approximately 50% nickel, known as Nitinol and/or Tinel, as discussed above. In addition or in the alternative, the one or more alloys may include, for example, one or more other alloying materials, such as niobium, as also discussed above.

One or more shrink fittings 600, 602, 604, 606 may include, for example, one or more materials that change dimension(s) when exposed to temperature changes and/or that have shape-memory characteristics. In an example embodiment, one or more shrink fittings 600, 602, 604, 606 may include one or more alloys of approximately 50% titanium and approximately 50% nickel, known as Nitinol and/or Tinel, as discussed above. In addition or in the alternative, the one or more alloys may include, for example, one or more other alloying materials, such as niobium, as also discussed above.

One or more shrink fittings 600, 602, 604, 606 may include many geometries. For example, one or more shrink fittings 600, 602, 604, 606 may be generally round (i.e., circular, oval-shaped, rounded, curved). In an example embodiment, one or more shrink fittings 600, 602, 604, 606 are shrink rings available, for example, from Memry Corporation.

Spool piece 500 may include one or more grooves, ridges, lips, etc. on its outer surface near one or both ends 506, 508. Similarly, sleeve 510, 512 may include one or more grooves, ridges, lips, etc. on its inner surface. When sleeve 510, 512 act on spool piece 500 and ends 302, 304 of the submerged line to fix or help fix spool piece 500 to ends 302, 304, the one or more grooves, ridges, lips, etc. on the outer surface of spool piece 500 and/or the one or more grooves, ridges, lips, etc. on the inner surface of sleeve 510, 512 may improve contact between sleeve 510, 512 and ends 506, 508 of spool piece 500, and/or improve contact between sleeve 510, 512 and ends 302, 304 of the submerged line.

In addition or in the alternative, sleeve 510, 512 may include one or more grooves, ridges, lips, etc. on its outer surface. Similarly, one or more shrink fittings 600, 602, 604, 606 may include one or more grooves, ridges, lips, etc. on their inner surface. When one or more shrink fittings 600, 602, 604, 606 act on sleeve 510, 512, the one or more grooves, ridges, lips, etc. on the outer surface of sleeve 510, 512 and/or the one or more grooves, ridges, lips, etc. on the inner surface of one or more shrink fittings 600, 602, 604, 606 may improve contact between sleeve 510, 512 and one or more shrink fittings 600, 602, 604, 606, improve contact between sleeve 510, 512 and ends 506, 508 of spool piece 500, and/or improve contact between sleeve 510, 512 and ends 302, 304 of the submerged line.

The one or more grooves may include, for example, one or more spiral grooves, one or more parallel grooves, and/or one or more circumferential grooves. The one or more grooves may or may not be continuous. The one or more ridges may include, for example, one or more spiral ridges, one or more parallel ridges, and/or one or more circumferential ridges. The one or more ridges may or may not be continuous. The one or more lips may or may not be continuous.

Sleeve 510, 512 may be disposed on spool piece 500 in the position(s) shown in FIG. 5 prior to spool piece 500 being disposed adjacent to corresponding ends 302, 304 of the submerged line. In addition or in the alternative, sleeve 510, 512 may be disposed elsewhere on spool piece 500 (or on end 302 and/or end 304 of the submerged line), and then disposed in the position(s) shown in FIG. 5 after spool piece 500 is disposed adjacent to corresponding ends 302, 304 of the submerged line.

In addition or in the alternative, one or more shrink fittings 600, 602, 604, 606 may be disposed on sleeve 510, 512 in the position(s) shown in FIG. 6 prior to spool piece 500 being disposed adjacent to corresponding ends 302, 304 of the submerged line and/or prior to sleeve 510, 512 being fitted over ends 506, 508 of spool piece 500 and corresponding ends 302, 304 of the submerged line. In addition or in the alternative, one or more shrink fittings 600, 602, 604, 606 may be disposed elsewhere on spool piece 500 or elsewhere on sleeve 510, 512 (or on end 302 and/or end 304 of the submerged line), and then disposed in the position(s) shown in FIG. 6 after spool piece 500 is disposed adjacent to corresponding ends 302, 304 of the submerged line and/or after sleeve 510, 512 is fitted over ends 506, 508 of spool piece 500 and corresponding ends 302, 304 of the submerged line.

Connecting the spool piece may include: connecting a body to one of the support brackets; and/or fixing the spool piece to the body.

One or more support brackets 202 may include, for example, a base and two or more fingers extending from the base. The fingers may include many geometries. For example, the fingers may approximate the shape of one or more rectangular solids.

Figure 8:
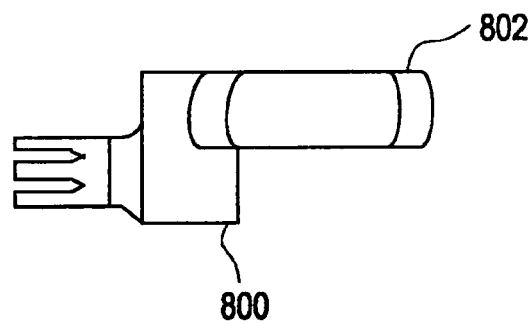
FIG. 8 is a front view of a body, according to another example embodiment.
Figure 9:
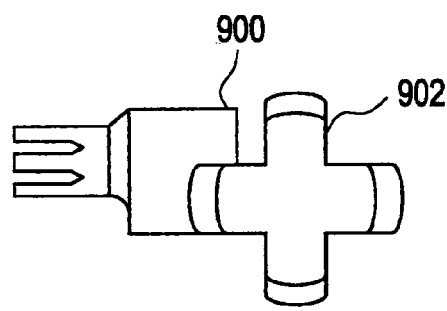
FIG. 9 is a front view of a body, according to yet another example embodiment.
Figure 7:
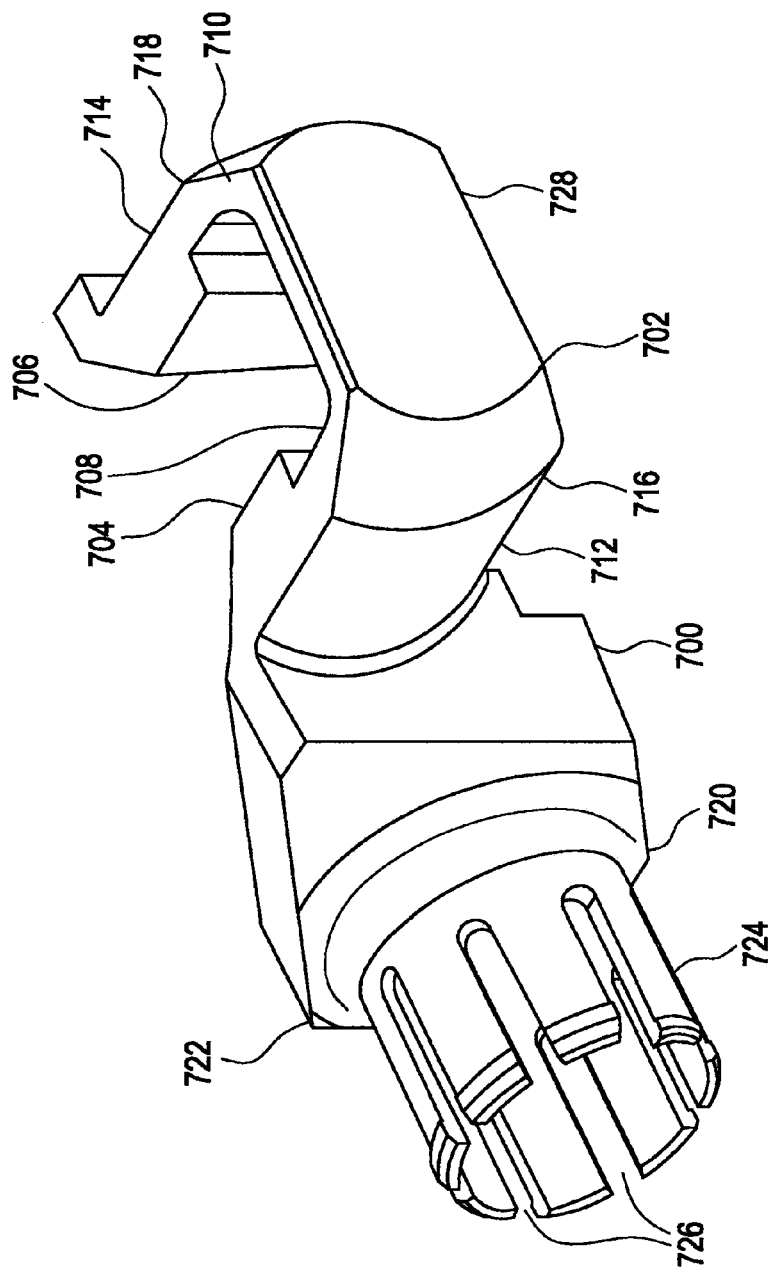
FIG. 7 is a perspective view of a body, according to an example embodiment.
Figure 10:
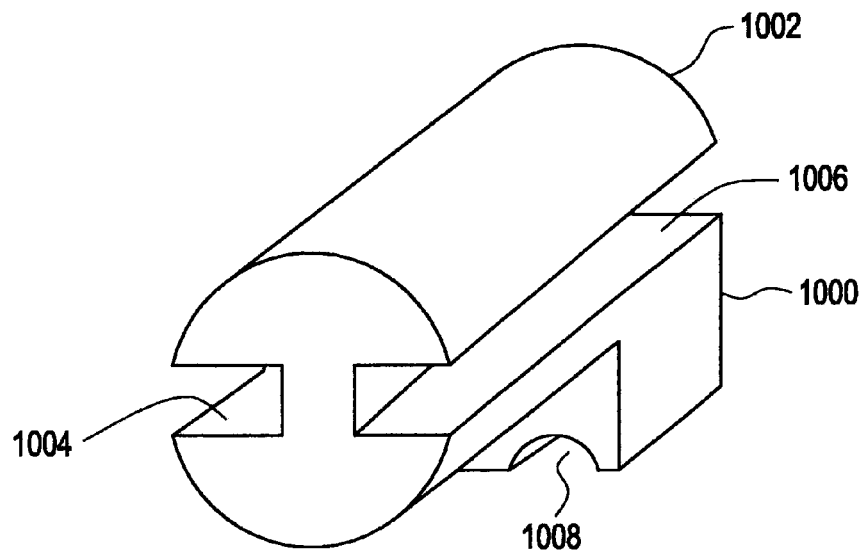
FIG. 10 is a perspective view of a body, according to still another example embodiment.

FIG. 7 is a perspective view of body 700, according to an example embodiment. FIG. 8 is a front view of body 800, according to another example embodiment. FIG. 9 is a front view of body 900, according to yet another example embodiment. FIG. 10 is a perspective view of body 1000, according to still another example embodiment.

Body 700 may be designed, for example, so that it may be connected to one of support brackets 202 by fitting at least a portion of body 700 onto one or more of the fingers and/or by fitting at least a portion of body 700 in between two or more of the fingers.

Body 700 may include many geometries. For example, portions of body 700 may approximate the shape of a rectangular solid, a ball, or a disk. In an example embodiment, first portion 802 of body 800 may approximate the shape of the letter "U" in one dimension so that, when viewed from the end opposite the tines of the "U," the cross-section of first portion 802 approximates a rectangular shape, as shown in FIG. 8. In another example embodiment, first portion 902 of body 900 may approximate the shape of the letter "U" in two dimensions so that, when viewed from the end opposite the tines of the "Us," the cross-section of first portion 902 approximates a cruciform shape, as shown in FIG. 9. In yet another example embodiment, first portion 1002 of body 1000 may approximate the shape of a cylinder, in whose surface two axial grooves 1004, 1006 have been formed, so that, when viewed from an axial direction, the cross-section of first portion 1002 may approximate the shape of the letter "I," as shown in FIG. 10.

One or more interior surfaces of body 700, 800, 900, 1000 may be sized, shaped, and/or oriented to facilitate connecting body 700, 800, 900, 1000 to support bracket 202, fitting at least part of body 700, 800, 900, 1000 onto one or more of the fingers, and/or fitting at least part of body 700, 800, 900, 1000 in between two or more of the fingers.

Figure 11:
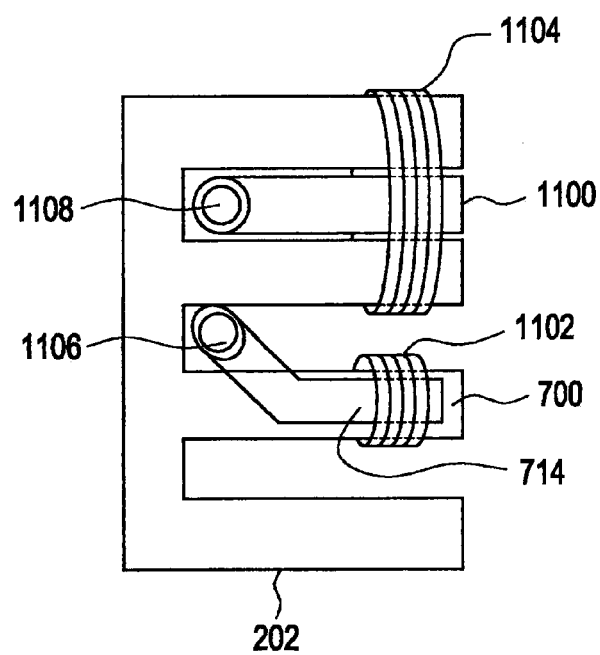
FIG. 11 is a side view of a support bracket, showing a first body and a second body connected to the support bracket.

FIG. 11 is a side view of support bracket 202, showing body 700 and body 1100 connected to support bracket 202. At least part of body 700 may fit onto one or more of the fingers. At least part of body 1100 may fit in between two or more of the fingers. One or more shrink fittings 1102 may connect body 700 to support bracket 202. One or more shrink fittings 1104 may connect body 1100 to support bracket 202. Spool piece 1106 may be connected to support bracket 202 by body 700 and/or one or more shrink fittings 1102. Spool piece 1108 may be connected to support bracket 202 by body 1100 and/or one or more shrink fittings 1104.

In an example embodiment, first portion 702 of body 700 may approximate the shape of the letter "U" in one dimension so that, when viewed from the end opposite the tines of the "U," the cross-section approximates a rectangular shape. Inner surfaces 704 and/or 706 of body 700 may facilitate connecting body 700 to support bracket 202, as shown in FIG. 11 (i.e., inner surfaces 704 and 706 may substantially match the shape of outer surfaces of the fingers of support bracket 202). In addition or in the alternative, second portion 708 and/or third portion 710 of body 700 may facilitate connecting body 700 to support bracket 202, as also shown in FIG. 11 (i.e., second portion 708 and/or third portion 710 may allow body 700 to flex open so that body 700 fits onto one or more of the fingers relatively easily and/or to flex closed so that body 700 connects tightly to support bracket 202).

Body 700 may be designed to be connected to support bracket 202 using one or more shrink fittings acting on body 700. In an example embodiment, body 700 may include one or more surfaces 712, 714 that facilitate this connection. For example, one or more surfaces 712, 714 may be sized, shaped, and/or oriented to accept the one or more shrink fittings. In an example embodiment, one or more surfaces 712, 714 may be rounded to accept one or more shrink fittings. In another example embodiment, one or more surfaces 712, 714 may include one or more lips 716, 718 to retain one or more shrink fittings. In yet another example embodiment, the one or more surfaces may include one or more grooves (not shown) to accept and retain one or more shrink fittings. In each of these example embodiments, the one or more shrink fittings may include one or more shrink rings.

Body 700 may include one or more sites 720 for fixing the spool piece to body 700 without welding. One or more sites 720 may be sized, shaped, and/or oriented to accept the spool piece. In addition or in the alternative, one or more sites 720 may be sized, shaped, and/or oriented to accept one or more shrink fittings.

The spool piece may be associated with at least one of one or more sites 720. Prior to fixing the spool piece to body 700 (and/or prior to connecting body 700 to support bracket 202), spool piece may be moved axially relative to the at least one of one or more sites 720. This axial movement allows the spool piece to be, for example, fitted over corresponding ends 302, 304 of the submerged line from which the damaged section was cut out or disposed adjacent to corresponding ends 302, 304 of the submerged line, instead of being fitted over them. After the spool piece is fitted over or disposed adjacent to corresponding ends 302, 304 of the submerged line, the spool piece may be fixed to the body by one or more shrink fittings acting on the at least one of one or more sites 720.

In an example embodiment, one or more sites 720 may include one or more collets 724. One or more collets 724 may be sized, shaped, and/or oriented to accept the spool piece. In addition or in the alternative, one or more collets 724 may be sized, shaped, and/or oriented to accept one or more shrink fittings. One or more collets 724 may include two or more kerf cuts 726.

The spool piece may be threaded through at least one of one or more collets 724. Prior to fixing the spool piece to body 700 (and/or prior to connecting body 700 to support bracket 202), the spool piece may be moved axially within one or more collets 724. This axial movement allows the spool piece to be, for example, fitted over corresponding ends 302, 304 of the submerged line from which the damaged section was cut out or disposed adjacent to corresponding ends 302, 304 of the submerged line, instead of being fitted over them. After the spool piece is fitted over or disposed adjacent to corresponding ends 302, 304 of the submerged line, the spool piece may be fixed to body 700 by one or more shrink fittings acting on the at least one of one or more collets 724.

In an example embodiment, a second portion of body 700 may include collet 724, as shown in FIG. 7. Collet 724 may include multiple kerf cuts 726, also as shown in FIG. 7. Collet 724 may be sized, shaped, and/or oriented to accept the spool piece. In addition or in the alternative, collet 724 may be sized, shaped, and/or oriented to accept a shrink fitting. The shrink fitting may be a shrink ring.

End 728 of body 700 may or may not be solid. For example, end 728 of body 700 may include an indentation or aperture (not shown) that can accommodate a finger of support bracket 202.

Body 1000 may include one or more sites 1008 for fixing a spool piece to body 1000 without welding. One or more sites 1008 may be sized, shaped, and/or oriented to accept the spool piece. In addition or in the alternative, one or more sites 1008 may be sized, shaped, and/or oriented to accept one or more shrink fittings. The one or more shrink fittings may act on one or more sites 1008 or on the spool piece and one or more sites 1008.

Figure 12:
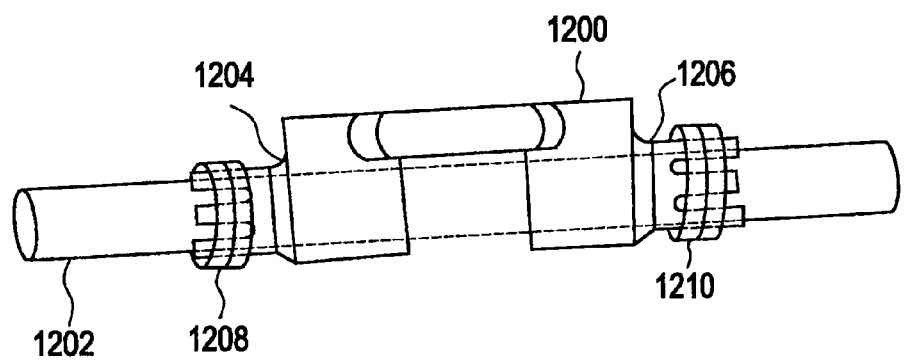
FIG. 12 is a diagram illustrating a body and a spool piece, according to an example embodiment.

FIG. 12 is a diagram illustrating body 1200 and spool piece 1202, according to an example embodiment. Body 1200 may include two sites 1204, 1206 for fixing spool piece 1202 to body 1200 without welding. Sites 1204, 1206 may be sized, shaped, and/or oriented to accept spool piece 1202. In addition or in the alternative, sites 1204, 1206 may be sized, shaped, and/or oriented to accept one or more shrink fittings 1208, 1210. One or more shrink fittings 1208, 1210 may act on sites 1204, 1206 or on spool piece 1202 and sites 1204, 1206.

Body 700, 800, 900, 1000, 1100, 1200 may include, for example, one or more materials used in construction of a nuclear reactor. Body 700, 800, 900, 1000, 1100, 1200 may include, for example, one or more high-strength alloys used in construction of a nuclear reactor. Body 700, 800, 900, 1000, 1100, 1200 may include, for example, one or more stainless steels (i.e., Type 304, Type 316, and/or Type XM19) and/or one or more nickel-chromium-iron alloys (i.e., Inconel™ X750).

In another example embodiment, methods of repairing nuclear reactors that include one or more submerged lines welded to one or more support brackets may include: removing one or more damaged sections of the one or more submerged lines; and/or replacing the one or more damaged sections of the one or more submerged lines without welding.

In yet another example embodiment, methods of operating nuclear reactors that include one or more submerged lines welded to one or more support brackets may include: shutting down the nuclear reactor; repairing damage to at least one of the one or more submerged lines without welding; and/or starting up the nuclear reactor.

As discussed above, repairing damage to the at least one of the one or more submerged lines may include: removing a damaged section of a submerged line welded to at least one of the one or more support brackets; and/or replacing the damaged section of the submerged line.

The damage to at least one of the one or more submerged lines may be repaired after the nuclear reactor is shut down and before the nuclear reactor is started up. Depending on the condition of the nuclear reactor, at least portion of the repair may begin before the nuclear reactor is shutdown or at least portion of the repair may begin while the nuclear reactor is being shut down.

In still another example embodiment, methods of operating nuclear reactors that include one or more submerged lines welded to one or more support brackets may include: cooling down the nuclear reactor; repairing damage to at least one of the one or more submerged lines without welding; and/or heating up the nuclear reactor.

The damage to at least one of the one or more submerged lines may be repaired after the nuclear reactor is cooled down and before the nuclear reactor is heated up. Depending on the condition of the nuclear reactor, the repair may be conducted without cooling down the nuclear reactor, at least portion of the repair may begin before the nuclear reactor is cooled down, or at least portion of the repair may begin while the nuclear reactor is being cooled down. The nuclear reactor may be cooled down, for example, to less than 400° F., 350° F., 300° F., 250° F., 212° F., 200° F., 175° F., 150° F., 125° F., 100° F., and/or 75° F. Heatup of the nuclear reactor may facilitate the changing of dimension(s), contraction, phase change, and/or shape-memory characteristics.

Although repairing damage to the submerged lines may be more difficult with flow through the nuclear reactor, the damage to at least one of the one or more submerged lines may be repaired under various flow conditions, including flow through one or more recirculation pumps and/or flow through one or more jet pump assemblies 138.

In a further example embodiment, apparatuses for repairing nuclear reactors that include one or more submerged lines welded to one or more support brackets may include: the body, discussed above, including one or more sites for fixing a spool piece to the body without welding.

In another further example embodiment, apparatuses for repairing nuclear reactors that include one or more submerged lines welded to one or more support brackets may include: the spool piece, discussed above; and/or the body, discussed above, including one or more sites for fixing the spool piece to the body without welding.

A kit for repairing nuclear reactors that include one or more submerged lines welded to one or more support brackets may include: the body, discussed above, including one or more sites for fixing a spool piece to the body without welding. In addition or in the alternative, the kit may include the spool piece, discussed above; and/or the body, discussed above, including one or more sites for fixing the spool piece to the body without welding. In addition or in the alternative, the kit may include the spool piece, the body (with two shrink fittings), and/or two couplings (with two sleeves and/or four shrink fittings).

Figure 13:
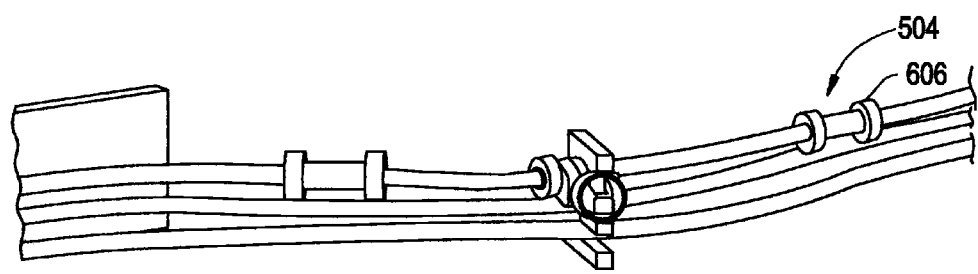
FIG. 13 is a first perspective view of a repair conducted using a body and two shrink fittings, as well as a spool piece and two couplings (two sleeves and four shrink fittings), similar to that of FIG. 6, according to an example embodiment.
Figure 14:
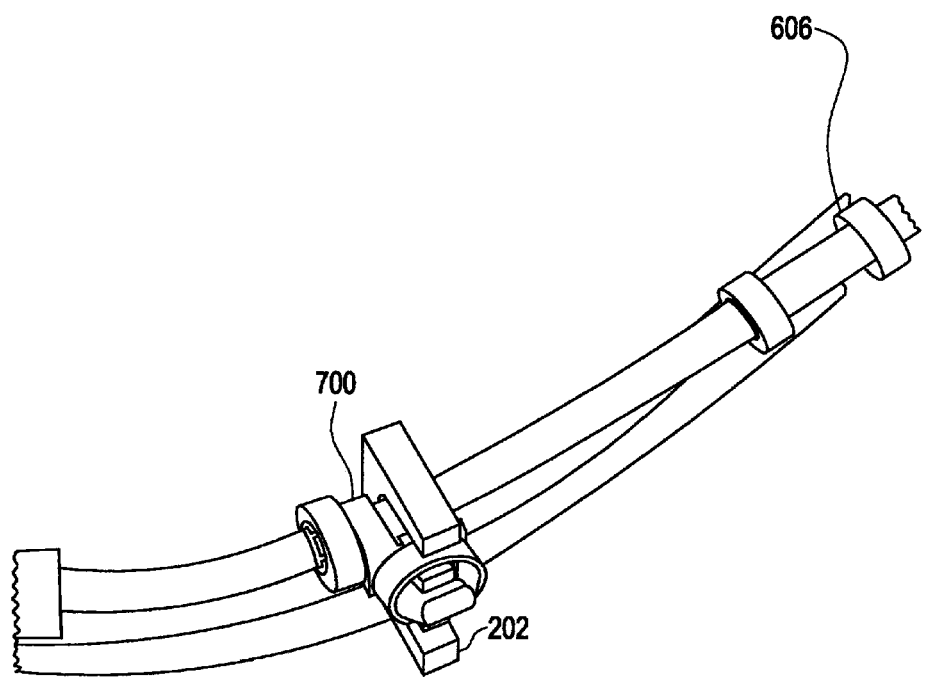
FIG. 14 is a second, closer perspective view of the repair of FIG. 13.

FIG. 13 is a first perspective view of a repair conducted using a body and two shrink fittings, as well as a spool piece and two couplings (two sleeves and four shrink fittings), similar to that of FIG. 6, according to an example embodiment. FIG. 14 is a second, closer perspective view of the repair of FIG. 13.

While example embodiments have been particularly shown and described, it will be understood by those of ordinary skill in the art that various changes in form and details may be made in the example embodiments without departing from the spirit and scope of the present invention as defined by the following claims.

What is claimed is:

1. A method of repairing at least one submerged lines welded to at least one support bracket in a nuclear reactor plant, the method comprising:
   removing a damaged section of at least one first submerged line of the at least one submerged line, by cutting out the damaged section from the first submerged line and cutting out an impaired section of the at least one first support bracket; and
   replacing the damaged section of the at least one first submerged line without welding,
   the at least one submerged line being configured to be submerged in a liquid during normal operation of the nuclear reactor plant,
   wherein replacing the damaged section includes,
      substituting a spool piece, comprising ends, in place of the damaged section;
      joining the ends of the spool piece to the at least one first submerged line, and
      connecting the spool piece to at least one first support bracket of the at least one support bracket.

2. The method of claim 1, wherein removing the damaged section further includes,
   cutting out an impaired section of at least one second support bracket of the at least one support bracket.

3. The method of claim 1, wherein connecting the spool piece comprises:
   connecting a body to the at least one first support bracket; and
   fixing the spool piece to the body.

4. The method of claim 3, wherein the body comprises at least one site for fixing the spool piece to the body without welding.

5. The method of claim 4, wherein the spool piece is fixed to the body by at least one shrink fitting acting on the at least one site or acting on the spool piece and the at least one site.

6. The method of claim 5, wherein the shrink fittings include one or more materials having a shape-memory characteristic.

7. The method of claim 3, wherein the body comprises at least one collet, and wherein the spool piece is fitted through the at least one collet.

8. The method of claim 1, wherein the connecting the spool piece to the at least one first support bracket includes directly connecting the spool piece to the at least one first support bracket.

9. A method of repairing at least one submerged line welded to at least one support bracket in a nuclear reactor plant, the method comprising:
   removing a damaged section of at least one first submerged line of the at least one submerged line by cutting out the damaged section from the at least one first submerged line; and
   replacing the damaged section of the at least one first submerged line without welding,
   the at least one first submerged line being configured to be submerged in a liquid during normal operation of the nuclear reactor plant,
   the replacing of the damaged section including,
      substituting a spool piece, comprising ends, in place of the damaged section;
      joining the ends of the spool piece to the at least one first submerged line, and
   connecting the spool piece to at least one first support bracket of the at least one support bracket, wherein connecting the spool piece includes connecting a body to the at least one first support bracket, and fixing the spool piece to the body, wherein the body includes at least one collet, and wherein the spool piece is fitted through the at least one collet, wherein after substituting the spool piece, the spool piece is fixed to the body by at least one shrink fitting acting on the at least one collet.

10. The method of claim 9, wherein the shrink fittings include one or more materials having a shape-memory characteristic.

11. A method of repairing at least one submerged line welded to at least one support bracket in a nuclear reactor plant, the method comprising:

removing at least one damaged section of the at least one submerged line by cutting out the damaged section from the at least one submerged line, wherein the removing the damage section includes cutting out an impaired section from one of the at least one support bracket; and replacing the at least one damaged section of the at least one submerged line without welding, the at least one submerged line being configured to be submerged in a liquid during normal operation of the nuclear reactor plant, the replacing the damaged section including, substituting a spool piece, comprising ends, in place of the damaged section;

joining the ends of the spool piece to the at least one submerged line, and connecting the spool piece to the at least one support bracket, wherein the connecting the spool piece includes, connecting a body to the at least one support bracket, and fixing the spool piece to the body.

* * * * *

UNITED STATES PATENT AND TRADEMARK OFFICE
CERTIFICATE OF CORRECTION

PATENT NO. : 9,959,943 B2  
APPLICATION NO. : 14/042927  
DATED : May 1, 2018  
INVENTOR(S) : Fred Charles Nopwaskey et al.

It is certified that error appears in the above-identified patent and that said Letters Patent is hereby corrected as shown below:

On the Title Page

Item (54) and in the Specification, Column 1, Line 1, "METHODS AND APPARATUS FOR OPERATING AND REPAIRING NUCLEAR REACTORS" should be --METHOD FOR REPAIRING NUCLEAR REACTORS WITH A SUBMERGED LINE WELDED TO A SUPPORT BRACKET--.

On page 2, Column 2, under item (56), U.S. Patent Documents "8,233,301 B1 7/2012 Guo" should be deleted.

In the Claims

Column 14, Line 1, "lines" should be "line.".

Signed and Sealed this  
Fourth Day of December, 2018

Andrei Iancu  
*Director of the United States Patent and Trademark Office*